United States Patent
Ponnuru et al.

(10) Patent No.: US 12,549,384 B2
(45) Date of Patent: Feb. 10, 2026

(54) CLOUD BASED CONFIDENTIAL WORKLOAD PROVISIONING

(71) Applicant: Dell Products L.P., Round Rock, TX (US)

(72) Inventors: Viswanath Ponnuru, Bangalore (IN); Vinay Sawal, Fremont, CA (US); Sumanth Vidyadhara, Bangalore (IN); Judith A. Furlong, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 18/410,146

(22) Filed: Jan. 11, 2024

(65) Prior Publication Data

US 2025/0233758 A1    Jul. 17, 2025

(51) Int. Cl.
*H04L 29/06* (2006.01)
*H04L 9/08* (2006.01)
*H04L 9/14* (2006.01)
*H04L 9/32* (2006.01)

(52) U.S. Cl.
CPC .......... *H04L 9/3265* (2013.01); *H04L 9/0825* (2013.01); *H04L 9/14* (2013.01)

(58) Field of Classification Search
CPC ....... H04L 9/3265; H04L 9/0825; H04L 9/14; H04L 9/3247; H04L 67/1096; H04L 67/1097

See application file for complete search history.

(56) References Cited

U.S. PATENT DOCUMENTS

| | | | |
|---|---|---|---|
| 11,888,848 B1* | 1/2024 | Wright | H04L 63/0428 |
| 2013/0239192 A1* | 9/2013 | Linga | H04L 63/061 726/3 |
| 2018/0212939 A1* | 7/2018 | Costa | H04L 63/061 |
| 2019/0140846 A1* | 5/2019 | Moore | H04L 9/0825 |
| 2021/0049284 A1* | 2/2021 | Tyagi | G06F 21/629 |
| 2022/0094690 A1* | 3/2022 | Tarkhanyan | G06F 9/505 |
| 2022/0103379 A1* | 3/2022 | Bursell | H04L 9/321 |
| 2023/0102816 A1* | 3/2023 | Lazim | G06F 8/71 717/168 |

OTHER PUBLICATIONS

BIOS Setup Utility User Guide for the Intel Server Boards D50TNP, M50CYP, and D40AMP, revised Jan. 2025.

* cited by examiner

*Primary Examiner* — Yogesh Paliwal
(74) *Attorney, Agent, or Firm* — Workman Nydegger

(57) ABSTRACT

Confidential workload provisioning is disclosed. To overcome various hardware constraints, a workload (e.g., image or container) to be executed confidentially in an enclave is verified and then re-signed by the cloud service. Re-signing the workload allows workloads to be provisioned confidentially in enclaves or other secure environments while eliminating hardware constraints that may impact workload provisioning.

14 Claims, 5 Drawing Sheets

CLOUD BASED CONFIDENTIAL WORKLOAD PROVISIONING

FIELD OF THE INVENTION

Embodiments of the present invention generally relate to provisioning workloads in computing resources. More particularly, at least some embodiments of the invention relate to systems, hardware, software, computer-readable media, and methods for confidentially provisioning workloads and/or efficiently allocating computing resources on constrained hardware in multi-tenant environments.

BACKGROUND

An enclave is an example of a trusted execution environment or may be part of a trusted execution environment. Code (or virtual machines, containers, executables, binaries) and data inside of the enclave are encrypted and cannot be read by another process. A trusted execution environment allows data/code to be encrypted/decrypted within the processor and provides memory and data isolation. Trusted execution environments such as enclaves provide a high level of security and can be used to protect both code and data from disclosure or modification. Trusted execution environments use encryption/decryption and may require the use of encryption keys (e.g., public/private keys). A trusted execution environment may be secured using embedded encryption keys and an attestation mechanism to ensure that the keys are available only to authorized code.

However, a trusted execution environment or enclave, even if software defined, is implemented in hardware and may be associated with various security policies or constraints. These polices or security controls can restrict what software can be run with enclave protections. The policies or constraints, in fact, can create resource management challenges and complicate the process of provisioning workloads and allocating resources.

For example, the hardware may have certain restrictions that can impact the ability of a cloud provider to allocate multiple enclaves to multiple tenants. For example, a physical server may limit the number of enclaves that can be run on that server. These restrictions can interfere with the process allocating hardware resources in scenarios including multi-tenant scenarios and interfere or complicate the process of provisioning confidential workloads in the computing resources of a cloud provider.

BRIEF DESCRIPTION OF THE DRAWINGS

In order to describe the manner in which at least some of the advantages and features of embodiments of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to resource allocation, resource management, and workload provisioning. More particularly, at least some embodiments of the invention relate to systems, hardware, software, computer-readable media, and methods for provisioning confidential workloads in trusted execution environments (TEE) such as enclaves or TEEs that include enclaves.

Embodiments of the invention relate to a provisioning mechanism of a cloud service that includes a signing service. The signing service allows a cloud service provider to allocate resources or provision a confidential workload while complying with, avoiding, or eliminating hardware constraints, such as a limited number of enclave or trusted execution environments per server.

When there is a need to provision a confidential workflow in response to a tenant (e.g., user, customer) request, embodiments of the invention may re-sign the workload with a private key associated with the cloud provider. This allows the keys or secrets of the cloud provider to be used to provision the confidential workloads in the hardware rather than the various keys or secrets of the tenants. Using the keys or secrets of the cloud provider reduces the number of keys used with enclaves created in the hardware and effectively eliminates the physical constraints of the hardware (e.g., limited number of keys for enclaves). Embodiments of the invention further track the keys associated with a given application (e.g., keys of cloud provider and keys of tenant) so that decryption/encryption can be performed when required during execution of the application.

Figure 1:
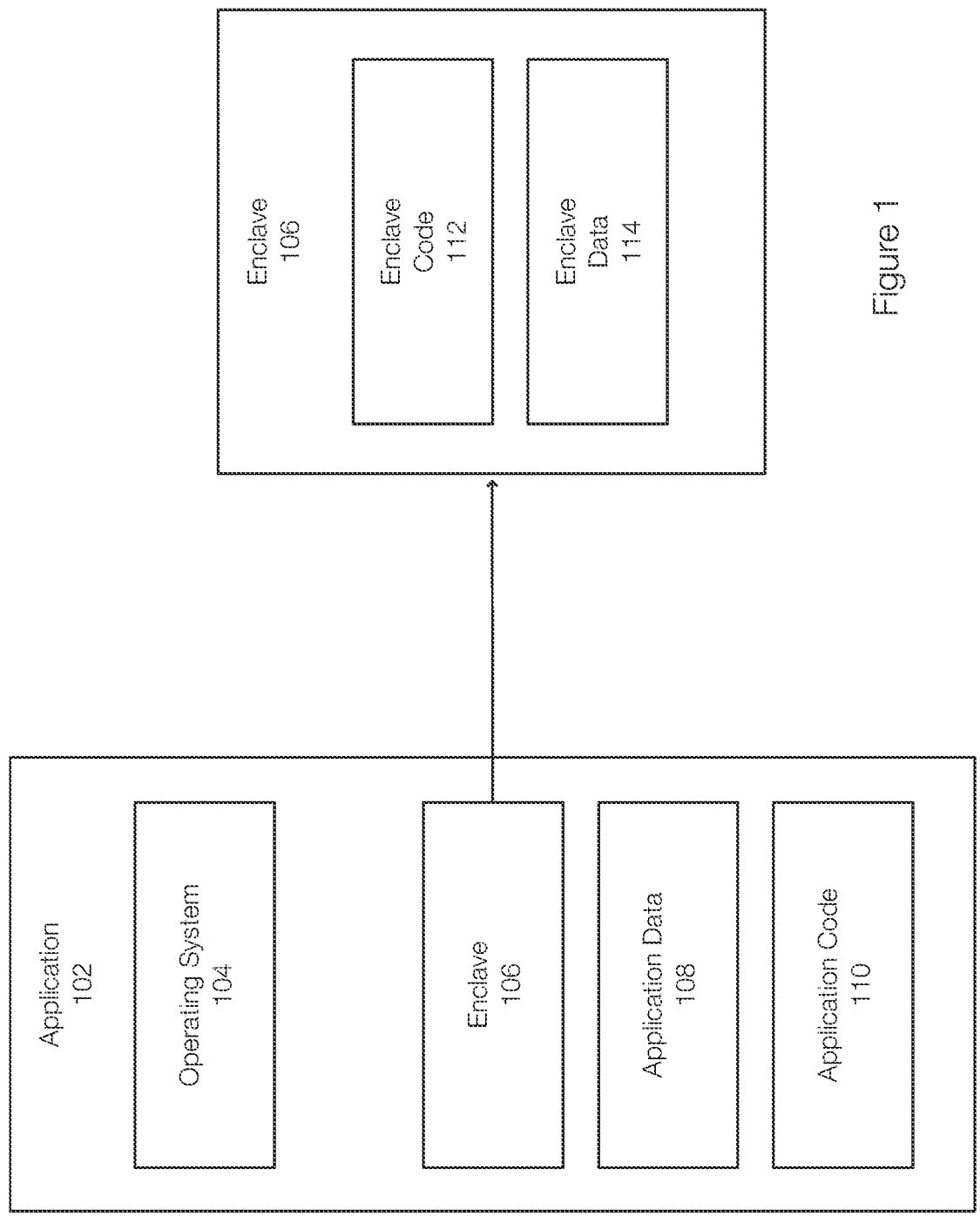
FIG. 1 discloses aspects of an enclave.

FIG. 1 discloses aspects of an enclave. FIG. 1 illustrates am application 102 (or process) that has been allocated resources including an enclave 106 in a computing environment (e.g., in a physical server). The enclave 106 (or more generally trusted execution environment) may be created in the processor and/or memory. The application 102 may include or have access to an operating system 104 and may also include an enclave 106, application data 108, and application code 110. The enclave 106 is associated with enclave code 112 and enclave data 114. The application 102 is generally representative of processes, images, virtual machines, containers, binaries, executables, or the like that may be deployed to an enclave or trusted execution environment.

In one example, the application 102 may have an untrusted portion and a trusted portion. In one example, the trusted or confidential portion of the application 102 is deployed in the enclave 106. However, an application may be completely contained within the enclave 106. The enclave 106 includes a trusted part of the application 102 and the untrusted part of the application 102 is not included in the enclave 106 in some examples. The untrusted portion is untrusted, in one example, in the sense that the untrusted portion is not placed in the enclave 106.

In one example, the untrusted portion of the application 102 may issue a call to the trusted portion of the application 102. Because the trusted portion in the enclave 106 is encrypted, keys or secrets are processed and used such that the function or call included in the enclave code 112 is executed in a processor. The results may be returned to the untrusted portion of the application 102 and/or stored in the enclave data 114. The enclave code 112 and the enclave data 114 are encrypted and decryption occurs within the processor in one example. More generally, decryption/encryption occurs within the enclave 106, which is not accessible by unauthorized entities. In one example, the enclave 106 may include secure portions of a processor and memory.

Figure 2:
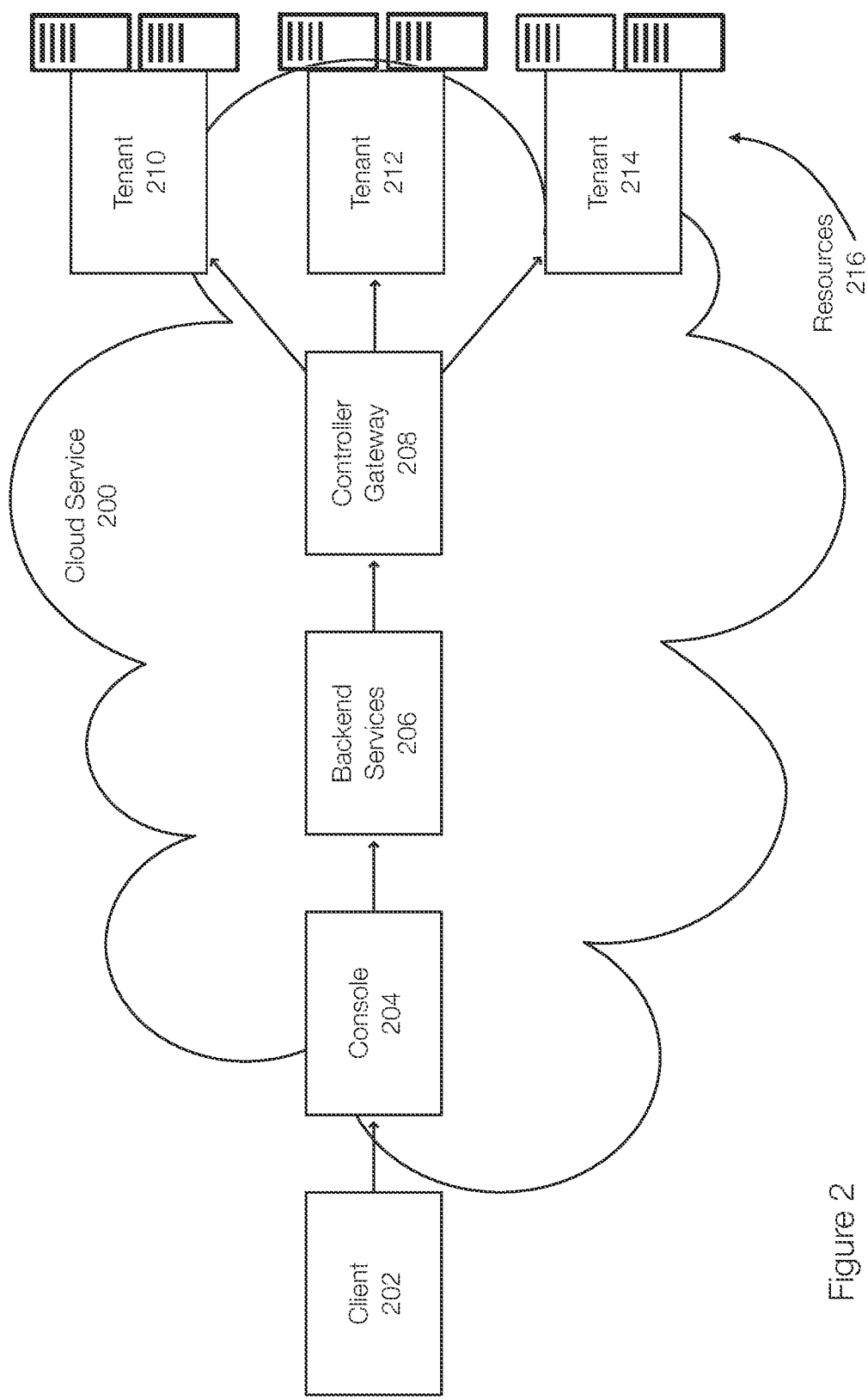
FIG. 2 discloses aspects of a cloud service that provides services to tenants.

FIG. 2 discloses aspects of a cloud service that may provide, by way of example, compute services, storage services, cyber and data protection, cloud platforms, high performance computing device services, trusted execution environments including enclaves, and the like or combinations thereof. DELL APEX is an example of the cloud service 200 that provides various services (e.g., as-a-Service).

In FIG. 2, a client 202 (i.e., a tenant) may access the cloud service 200 and interface with a console 204. The console 204 may allow the client 202 to manage and orchestrate their services that they have acquired or use in the cloud service 200. A tenant, through the client 202, may access the console 204 to discover services, select services and options, deploy or initiate workloads or services, monitor services being provided, or the like.

More specifically, through the console 204, the client 202 may initiate services, manage services, provision jobs/workloads, perform backup operations, execute applications, access storage, or the like. The backend services 206 may execute or perform any requests or commands of the client 202 received through the console 204. A controller gateway 208 may interface the backend services 206 with resources 216. The backend services 206 may access the data or other objects or applications that may be stored in the resources 216 via the controller gateway 208.

In one example, the cloud service 200 (or the resources 216) is a multi-tenant cloud or multi-tenant resources. Thus, multiple tenants (e.g., users, entities, organizations) may share the resources 216, which may include servers, storage, memory, or the like. In one example, each tenant may establish one or more enclaves (or trusted execution environments) in the resources 216 for various reasons. As previously stated, provisioning and managing enclaves may be complicated by hardware constraints. For example, the number of enclaves supported by a physical server may be limited and this constraint may impact the ability of the cloud service 200 to allocate resources efficiently and provision confidential workloads.

By way of example, each of the tenants 210, 212, and 214 represents tenant premises in the resources 216. FIG. 2 further illustrates that some of the resources 216 have been allocated to the tenants 210, 212, and 214 as tenant premises. The allocated resources may configured to include enclaves or the ability to create on-demand enclaves. Embodiments of the invention relate to provisioning workloads of the tenants in the computing resources (e.g., multi-tenant computing resources).

To facilitate provisioning confidential workloads, embodiments of the invention may include a signing service. In essence, the signing service re-signs a tenant's application. By re-signing the application, this allows the service 200 to provide improved resource management and overcome the constraints of the hardware, which may include constraints of the physical servers. The specific constraints of a physical hardware may depend on the make/model of the physical hardware. For example, when the hardware limits the number of enclaves by allowing a specified number of keys or secrets, embodiments of the invention overcome this constraint by using a single key or a set of keys that belong to or are associated with a cloud provider. The enclaves are established using the keys of the cloud provider. More specifically, multiple workloads from one or more tenants may be re-signed with the key of the cloud provider. This removes the hardware constraint controlling the number of enclaves that can be created without sacrificing tenant privacy or the confidentiality of the workload.

Figure 3:
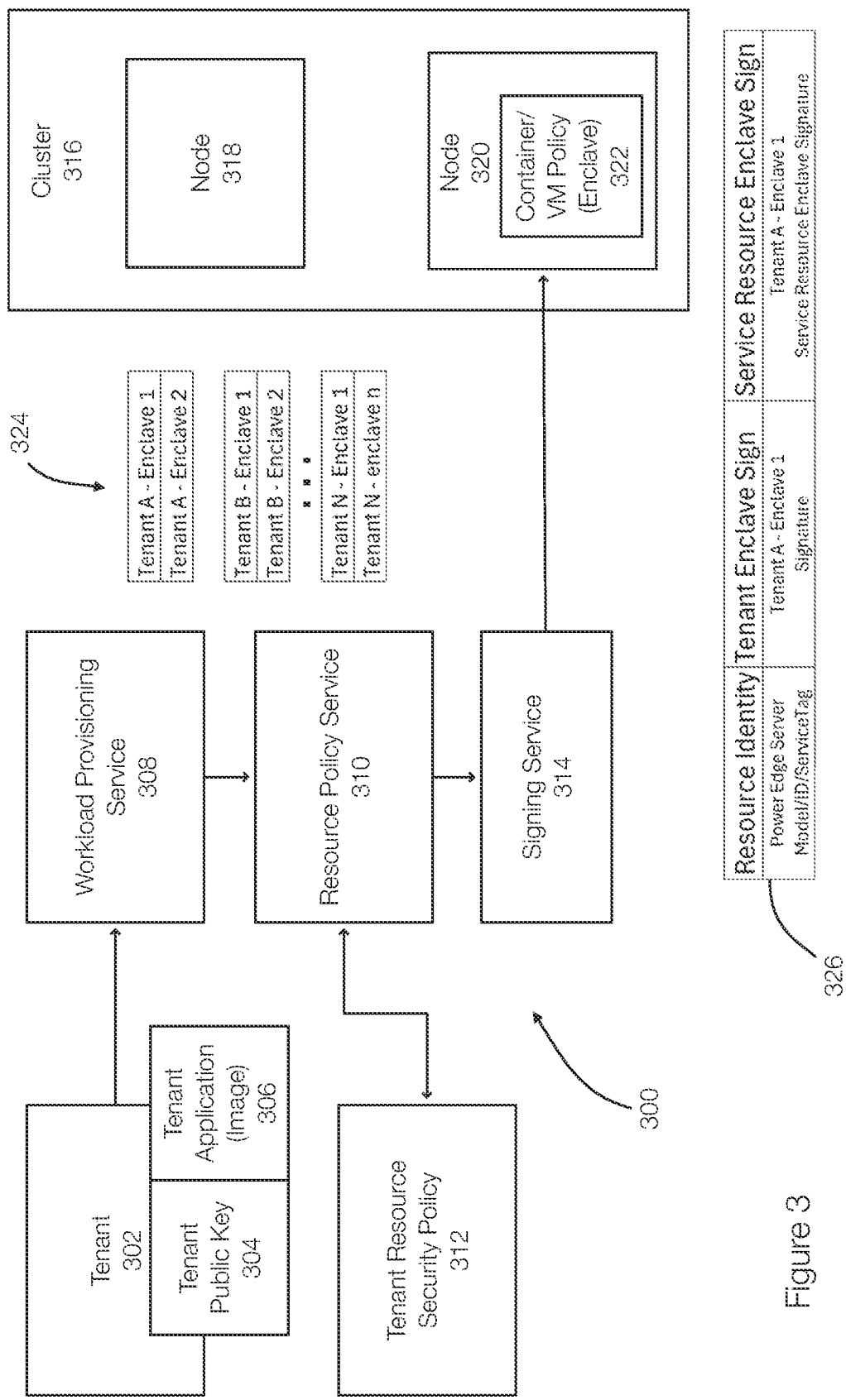
FIG. 3 discloses aspects of provisioning workloads in cloud resources of a cloud service provider.

FIG. 3 discloses aspects of provisioning confidential workloads in cloud resources of a cloud service. Initially, a tenant 302 may have an application 306 to be executed in an enclave. The application 306 may represent a container image, for example. The tenant application 306 or the tenant 302 may be associated with a public key 304. The tenant 302 may issue a confidential provisioning request to the workload provisioning service 308. The request may include or identify the application 306 and the public key 304. The request may be to execute the application 306 in a confidential manner, which may include executing the application 306 (or portion thereof) in an enclave or trusted execution environment. As a result, the cloud service 300 may provision the application 306 in an enclave.

More specifically, a workload provisioning service 308 may verify the request or the application received from or identified by the tenant 302. This may include downloading the application (or image) from an application or image source, authenticating/verifying the application, which may have been signed by a signing service associated with the tenant or using a private key of the tenant. More specifically in one example, the application 306 is not decrypted during the provisioning process. However, the cloud service 300 ensures the tenant certificate authenticity by verifying the tenant public key 304.

Next, a resource policy service 310 may obtain or access a tenant resource security policy 312. The security policy 312 may relate to resource sharing (e.g., public, private), hardware attestation policy, migration policy, fault tolerance monitoring, or the like. These may be aspects of the enclave being created in response to the request for provisioning a confidential workload.

After the cloud service 300 has downloaded or obtained the application, the application may be verified or validated. This may include validating the signed application and the public key of the tenant. Once this is completed, the signing service 314 re-signs the application 306 with a private key in one example. The public key of the signing service 314 (or more generally of the cloud service 300) may also be associated with provisioning the application 306 in a trusted execution environment such as an enclave.

As illustrated in FIG. 3, the computing resources of the cloud service 300 may include a cluster 316 of servers, represented by nodes 318 and 320. The nodes 318 and 320 may be physical machines, virtual machines, or the like. The tenant application 306, which is re-signed using the cloud provider's key, may be deployed (e.g., as a container or virtual machine) to an enclave 322 created in the node 320 in response to the confidential workload provisioning request received from the tenant 302. As previously stated, the application 306 is not decrypted, but is re-signed. As a result, the keys used to deploy or provision the application in the cluster 316 are the keys of the cloud provider and not the keys of the tenant. This assists in overcoming hardware constraints on the number of keys/enclaves.

The table 324 generally represents that various tenants are associated with various enclaves that have been configured or provisioned in nodes of the cluster 316. The table 326 represents a relationship between the resource identity, the tenant enclave signature, and the signing service enclave signature. For example, the node 320 may be a power edge server and the tenant A-enclave 1 corresponds to the enclave 322. The container or application was signed or re-signed with the service resource enclave signature (e.g., the key of the signing service 314). These relationships, which are also securely stored, allow the application 306 to be executed in a secure environment (the enclave 322) using keys of the signing service 314. This allows the keys of the signing service 314 to be used for multiple enclaves and overcomes, in one example, constraints of the node 320 that would otherwise limit the number of enclaves.

FIG. 3 illustrates that the key of the cloud provider is used to sign the enclave images or application for consistent trusted execution environment resource provisioning in the cluster 316.

Figure 4:
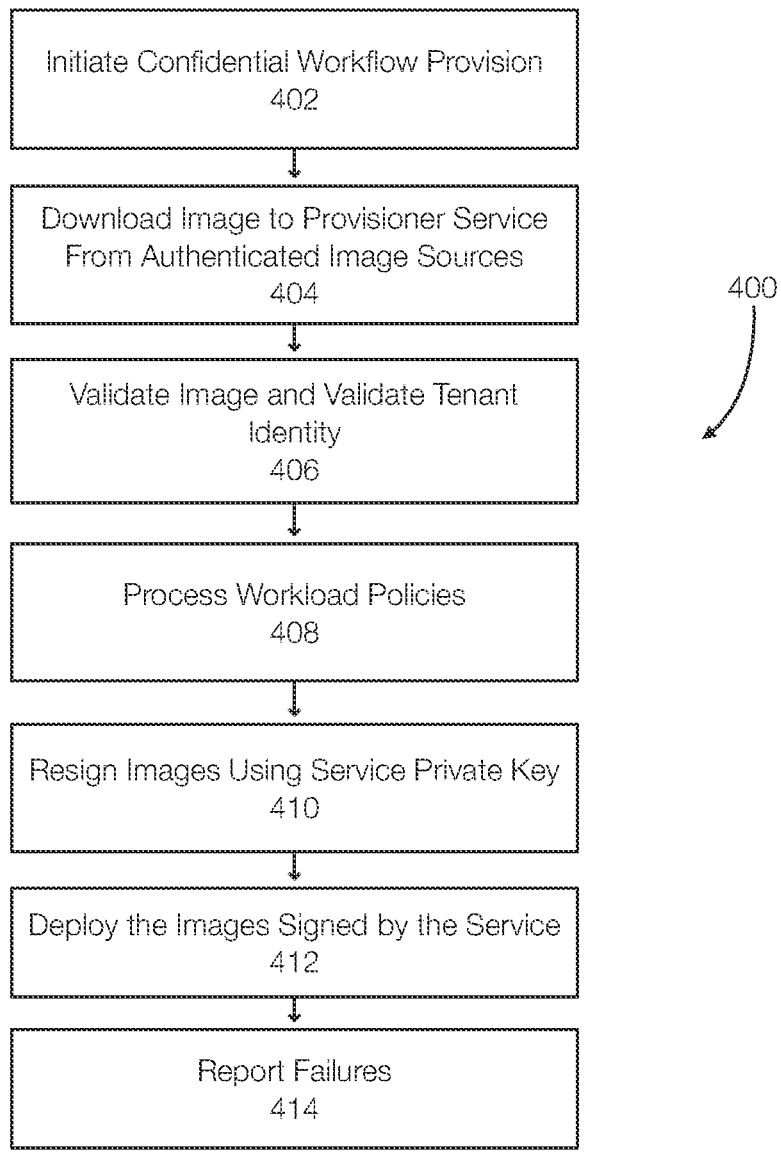
FIG. 4 discloses aspects of a method for provisioning confidential workloads in the cloud resources of a cloud provider.

FIG. 4 discloses aspects of a method for provisioning confidential workloads in a computing environment such as a multi-tenant cloud. The method 400 includes initiating 402 a confidential workflow provisioning operation. This process of provisioning a workflow is typically initiated by a tenant through the console of the cloud service in one example. Thus, the cloud service may receive a request to provision a confidential workflow or application.

In one example, an image (e.g., a container or virtual machine image or other application) may be downloaded 404 by the provisioning service provided by the cloud service. The image may be downloaded or retrieved from authenticated image sources or libraries. In one example, the image and/or tenant public key are validated or verified 406. For example, the image retrieved from the image source may be signed by a signing service of the tenant. This allows the tenant and the cloud service to authenticate the image. Further, when onboarding the tenant or at another time, an identify of the tenant is validated by verifying the certificate chain of the tenant's signing service that was issued by the certificate authority used by the tenant. In effect, the tenant's public key is verified.

Next, workload policies are processed 408 for the image, which is encrypted. A policy service of the cloud service may process the tenant's specific workload provisioning polices. For example, the cloud service may receive or retrieve a resource policy (e.g., policy document) from the tenant or from a storage.

Next, the cloud service may include a signing service that re-signs 410 the image using the signing service's private key. The corresponding public key may be certified by the certificate authority of the cloud service. Once the image is re-signed and certified or authenticated, the image is deployed or provisioned to a target system in the tenant cluster. More specifically, the image may be deployed to an enclave of a target system.

Because the image is signed using the keys of the cloud service, the ability of the cloud service to deploy workloads to enclaves is not constrained by a limited number of public keys. Rather, the same public key, in one example, may be used for multiple workloads from one or more tenants. Deploying the images signed (or re-signed) by the cloud service may require a table to be maintained that associates the target system (e.g., the enclave and/or physical server), the tenant enclave signature, and the cloud service's signing service signature.

Once the workloads are successfully provisioned on a tenant cluster (or other resources), failures may be reported 414 for at least logging and audit operations.

As apparent from this disclosure, an embodiment of the invention may possess various useful features and aspects, although no embodiment is required to possess any of such features or aspects. An embodiment may comprise cloud-managed services for multiple tenants that may include, trusted execution environment provisioning, enclave provisioning and management. As another example, an embodiment may comprise confidential workload provisioning for multiple tenants, which may include key management operations, authentication operations, enclave creation and management operations, signing services and operations, and the like.

Following are some further example embodiments of the invention. These are presented only by way of example and are not intended to limit the scope of the invention in any way.

Embodiment 1

A method comprising: receiving a request to provision a confidential workflow from a tenant at a cloud service, the confidential workflow including an application that has been signed with a private key of the tenant, identifying resource policies of the tenant, re-signing the application by a signing service of the cloud service, and provisioning the application in a trusted execution environment, wherein execution of the application in the trusted execution environment includes performing encryption and/or decryption operations using keys of the cloud service.

Embodiment 2

The method of embodiment 1, wherein the trusted execution environment comprises an enclave, wherein the keys of the signing service comprise a private key and a public key wherein the signing service re-signs the application with the private key.

Embodiment 3

The method of embodiment 1 and/or 2, further comprising provisioning multiple application in corresponding applications using the keys of the cloud service, the keys of the signing service comprising a private key and a public key, wherein the signing service signs each of the applications with the private key.

Embodiment 4

The method of embodiment 1, 2, and/or 3, further comprising downloading the application from an authenticated application source and validating the application that has been signed using keys associated with the tenant.

Embodiment 5

The method of embodiment 1, 2, 3, and/or 4, further comprising validating the image and the tenant by verifying a certificate chain associated with a certificate authority associated with the client.

Embodiment 6

The method of embodiment 1, 2, 3, 4, and/or 5, further comprising certifying a public key included in the keys of the cloud service by a certificate authority of the cloud service.

Embodiment 7

The method of embodiment 1, 2, 3, 4, 5, and/or 6, further comprising deploying the application signed by the signing service to the trusted execution environment.

Embodiment 8

The method of embodiment 1, 2, 3, 4, 5, 6, and/or 7, further comprising maintaining a table that associates a resource identify in which the trusted execution environment is located with a tenant enclave signature and with an enclave signature of the signing service, wherein the tenant enclave signate is associated with the private key of the tenant.

Embodiment 9

The method of embodiment 1, 2, 3, 4, 5, 6, 7, and/or 8, further comprising reporting failures for logging and audit purposes.

Embodiment 10

The method of embodiment 1, 2, 3, 4, 5, 6, 7, 8, and/or 9, further comprising applying the resource policies of the tenant to the trusted execution environment.

Embodiment 11

A system, comprising hardware and/or software, operable to perform any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term client, module, component, engine, agent, service, or the like may refer to software objects or routines that execute on the computing system or may also refer to hardware depending on context. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 5:
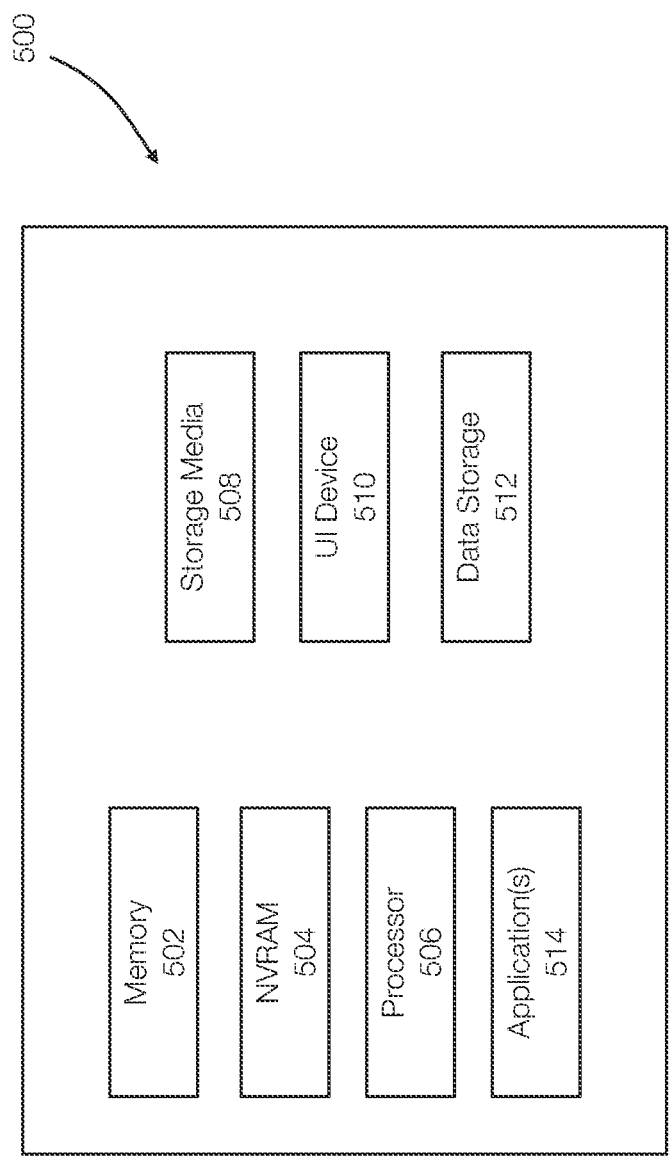
FIG. 5 discloses aspects of a computing device, system, or entity.

With reference briefly now to FIG. 5, any one or more of the entities disclosed, or implied, the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 500 may also be representative of servers, clusters of servers, nodes, or the like. The computing resources represented by the device 500 may represent the computing resources of a cloud provider that can be allocated or used for multi-tenant purposes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a request to provision a confidential workflow from a tenant at a cloud service, the confidential workflow including an application that has been signed by a private key of the tenant;
   identifying resource policies of the tenant;
   re-signing the application by a signing service of the cloud service;
   provisioning a trusted execution environment for the confidential workflow;
   applying the resource policies to the trusted execution environment;
   deploying the application signed by the signing service to the trusted execution environment, wherein execution of the application in the trusted execution environment includes performing encryption and/or decryption operations using keys of the cloud service; and
   maintaining a table that associates a resource identity in which the trusted execution environment is located with a tenant enclave signature and with an enclave signature of the signing service, wherein the tenant enclave signature is associated with the private key of the tenant.

2. The method of claim 1, wherein the trusted execution environment comprises an enclave, wherein the keys of the signing service comprise a private key and a public key wherein the signing service re-signs the application with the private key.

3. The method of claim 1, further comprising provisioning multiple application in corresponding applications using the keys of the cloud service, the keys of the signing service comprising a private key and a public key, wherein the signing service signs each of the applications with the private key.

4. The method of claim 1, further comprising downloading the application from an authenticated application source and validating the application that has been signed using keys associated with the tenant.

5. The method of claim 1, further comprising validating an image and the tenant by verifying a certificate chain associated with a certificate authority associated with the client.

6. The method of claim 1, further comprising certifying a public key included in the keys of the cloud service by a certificate authority of the cloud service.

7. The method of claim 1, further comprising reporting failures for logging and audit purposes.

8. A non-transitory storage medium having stored therein instructions that are executable by one or more hardware processors to perform operations comprising:
   receiving a request to provision a confidential workflow from a tenant at a cloud service, the confidential workflow including an application that has been signed by a private key of the tenant;
   identifying resource policies of the tenant;
   re-signing the application by a signing service of the cloud service;
   provisioning a trusted execution environment for the confidential workflow;
   applying the resource policies to the trusted execution environment;
   deploying the application signed by the signing service to the trusted execution environment, wherein execution of the application in the trusted execution environment includes performing encryption and/or decryption operations using keys of the cloud service; and
   maintaining a table that associates a resource identity in which the trusted execution environment is located with a tenant enclave signature and with an enclave signature of the signing service, wherein the tenant enclave signature is associated with the private key of the tenant.

9. The non-transitory storage medium of claim 8, wherein the trusted execution environment comprises an enclave, wherein the keys of the signing service comprise a private key and a public key wherein the signing service re-signs the application with the private key.

10. The non-transitory storage medium of claim 8, further comprising provisioning multiple application in corresponding applications using the keys of the cloud service, the keys of the signing service comprising a private key and a public key, wherein the signing service signs each of the applications with the private key.

11. The non-transitory storage medium of claim 8, further comprising downloading the application from an authenticated application source and validating the application that has been signed using keys associated with the tenant.

12. The non-transitory storage medium of claim 8, further comprising validating an image and the tenant by verifying a certificate chain associated with a certificate authority associated with the client.

13. The non-transitory storage medium of claim 8, further comprising certifying a public key included in the keys of the cloud service by a certificate authority of the cloud service.

14. The non-transitory storage medium of claim 8, further comprising reporting failures for logging and audit purposes.

\* \* \* \* \*